United States Patent [19]

Daley

[11] Patent Number: 5,003,708

[45] Date of Patent: Apr. 2, 1991

[54] CUSTOM INSOLE FOR ATHLETIC SHOES

[75] Inventor: Peter A. Daley, Steamboat Springs, Colo.

[73] Assignee: Dynamic Foam Products, Inc., Steamboat Springs, Colo.

[21] Appl. No.: 444,713

[22] Filed: Dec. 1, 1989

Related U.S. Application Data

[62] Division of Ser. No. 248,612, Sep. 26, 1988, Pat. No. 4,901,390.

[51] Int. Cl.⁵ ............................................. A43B 13/40
[52] U.S. Cl. ........................................... 36/44; 36/71
[58] Field of Search ............... 36/44, 43, 71; 128/595; 264/223

[56] References Cited

U.S. PATENT DOCUMENTS

| | | | |
|---|---|---|---|
| 2,457,737 | 12/1948 | Scholl | 264/223 |
| 3,825,017 | 7/1974 | Scrima | 36/44 |
| 3,895,405 | 7/1975 | Edwards | 36/93 |
| 4,232,457 | 11/1980 | Mosher | 36/44 |
| 4,586,273 | 5/1986 | Chapnick | 36/44 |
| 4,627,179 | 12/1986 | McElroy | 36/44 |
| 4,633,598 | 1/1987 | Moronaga et al. | 36/44 |
| 4,642,912 | 2/1987 | Wildman et al. | 36/44 |
| 4,702,255 | 10/1987 | Schenkl | 36/44 |

Primary Examiner—Steven N. Meyers
Attorney, Agent, or Firm—John E. Reilly

[57] ABSTRACT

A custom insole is made up of a plurality of layers of a thermoformable material united together at their interfaces to conform in size and contour to the bottom surface of a foot, the layers comprising at least one strength layer and at least one filler layer united to the strength layer and contoured to conform to the bottom surface of the foot; and an arch flange curves upwardly for a distance to laterally support the bone structure in the arch area of the foot. In the method of making the insole, an unformed blank of thermoformable material is placed on a resilient support portion with the ball portion on a firm surface and, by placing the foot on top of the layers and applying downward pressure, it will cause the heel of the foot to form a depression in the heel portion and the ball portion of the foot to flatten out the layers resting on the firm surface. When the foot is removed, the blank is removed and the bottom surface beneath the heel is flattened to align it with the flat undersurface of the ball portion of the insole.

11 Claims, 2 Drawing Sheets

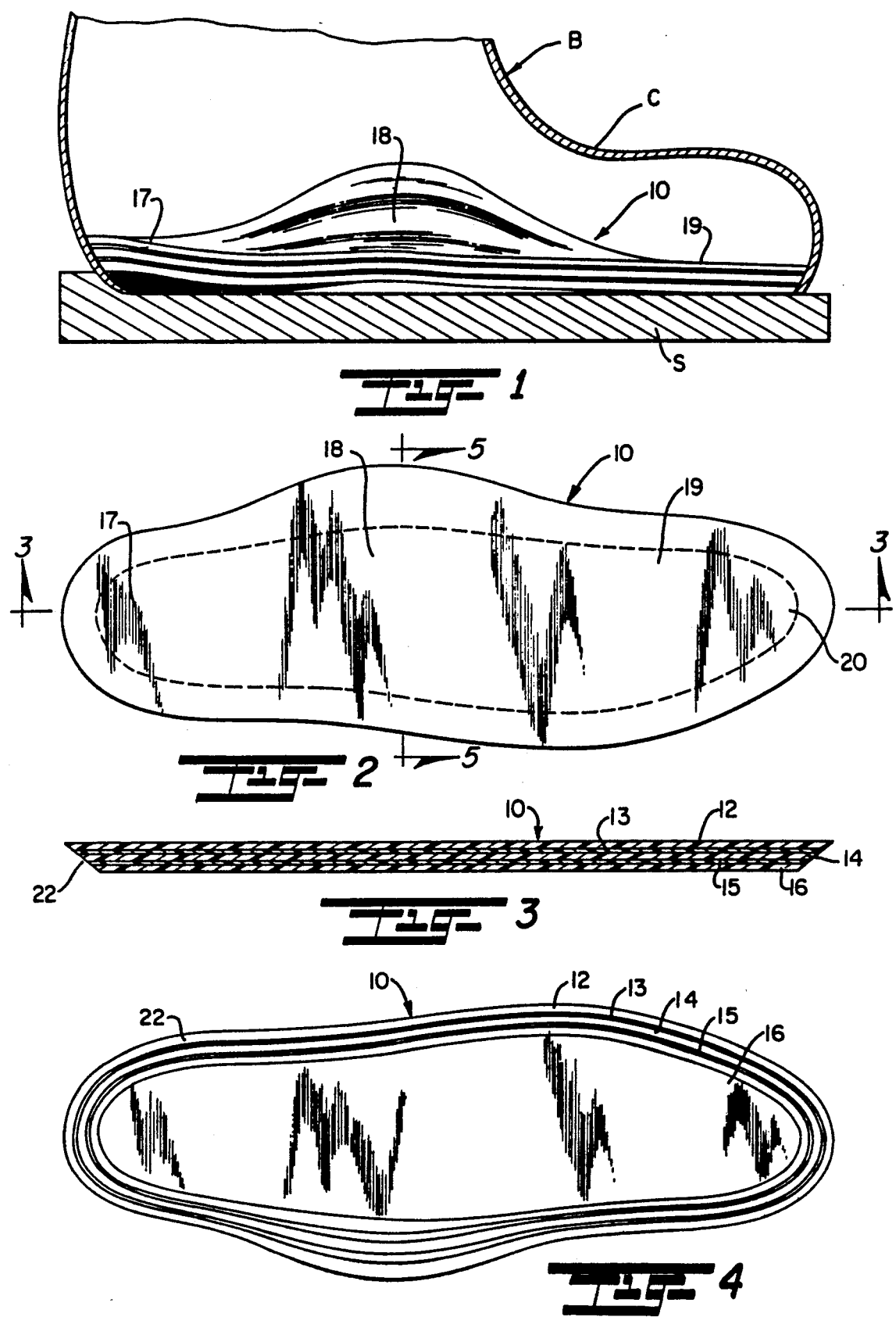

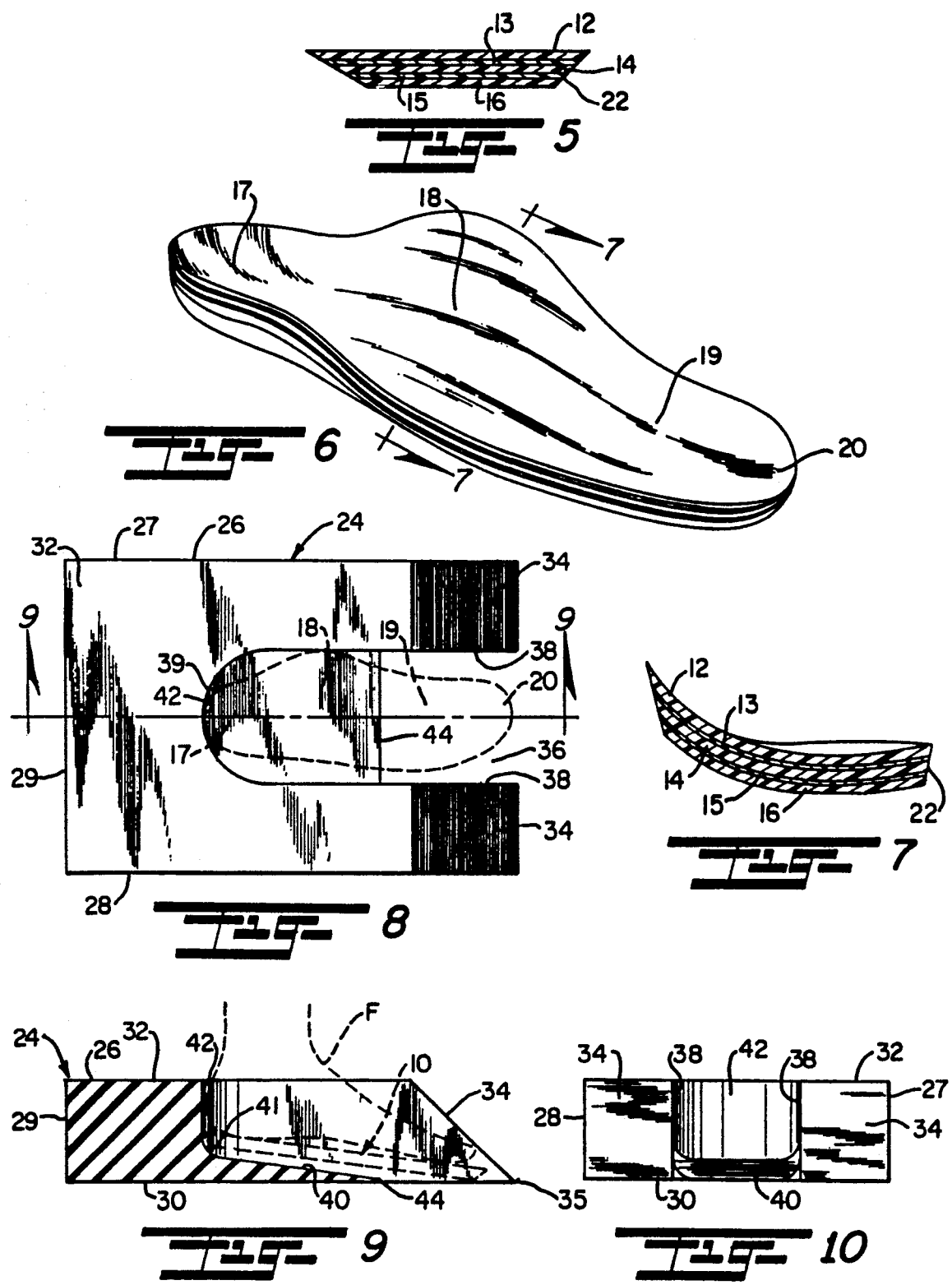

CUSTOM INSOLE FOR ATHLETIC SHOES

RELATED APPLICATIONS

This application is a divisional application of Ser. No. 248,612 filed Sept. 26, 1988, Now U.S. Pat. No. 4,901,390 for custom insole for athletic shoes and method and apparatus for making same, invented by Pater A. Daley.

This invention relates to footwear; and more particularly relates to a novel and improved insole which is specifically adaptable for use in medical or athletic footwear and to a novel and improved method and apparatus for making same.

BACKGROUND AND FIELD OF THE INVENTION

Various approaches have been taken in the past in the design and construction of laminated insoles for shoes and particularly for athletic footwear which can be molded to the shape of the foot and wherein the laminations making up the insole are given different characteristics to the end of providing maximum comfort and stability. Of the approaches taken in the past, U.S. Pat. No. 4,187,621 to L. H. Cohen discloses an insole which is made up of layers of a closed cell polyethylene foam having high impact absorption, the bottom layer being of greater density than the top layer and the layers bonded together by heat prior to molding. U.S. Pat. No. 4,130,948 to H. D. Krug is directed to a multi-layered insole having a plurality of closed cell polyolefin or polyethylene foam layers wherein the specific gravity of the layers increases progressively from the bottom to the top layer. U.S. Pat. No. 3,825,017 to J. E. Scrima discloses a solid layer which is interpositioned between top and bottom foam layers. In U.S. Pat. No. 4,633,598 to Y. Moronaga et al, the insole has a plurality of layers of different hardness with the heel portion increasing in hardness from the top to the bottom layer. Other representative patents of interest are U.S. Pat. Nos. 2,808,663 to L. P. Frieder et al; 4,520,581 to J. M. Irwin et al; 4,513,518 to R. A. Jalbert et al; 4,522,777 to W. Peterson; 4,669,142 to G. C. Meyer; and 4,718,179 to D. N. Brown. Of these, Peterson, Irwin and Meyer are of interest for disclosing molding apparatus for "cast-in-place" insoles.

It is proposed in accordance with the present invention to provide for a custom insole adaptable for use in athletic footwear as well as medical applications and with particular characteristics which lend well for use in ski boots to achieve maximum stability and comfort; and further to provide for a novel and improved casting process for molding the insole to the foot of the wearer in a simple but highly effective manner.

SUMMARY OF THE INVENTION

Accordingly, it is an object of the present invention to provide for a novel and improved insole for footwear which is capable of being custom-molded to the foot in such a way as to achieve optimum stability, comfort and control in use.

It is another object of the present invention to provide for a novel and improved custom insole which is versatile with optimum shock absorption and rebound characteristics and which will minimize fatigue while enhancing the strength of the foot.

It is a further object of the present invention to provide for a novel and improved custom insole which is readily moldable and is comprised of a series of laminations which are so combined with a well-defined heel cup and extended arch flange as to achieve increased sensitivity while permitting the foot to be more relaxed and comfortable.

It is a still further object of the present invention to provide for a novel and improved method of making a custom insole which will cause the insole to conform itself to the foot while offering improved stability, control and performance in use; and further wherein the method requires a minimum number of steps and is adaptable for use as a direct mold process in which the insole can be molded by normal standing foot pressure followed by grinding and otherwise shaping to establish the necessary conformation to the shoe or boot.

An additional object of the present invention is to provide for a novel and improved method and apparatus for manufacturing a multi-layered, custom insole in a dependable and effective manner.

In accordance with the present invention, a custom insole is comprised of a plurality of layers of a thermoformable material united together at their interfaces to conform in size and contour to the bottom surface of a foot, the layers comprising at least one strength layer having a density on the order of 11 lbs. per cubic foot with a thickness on the order of $\frac{1}{8}"$, and at least one filler layer united to said strength layer having a density on the order of 4 lbs. per cubic foot to 6 lbs. per cubic foot and a thickness on the order of 1/16", said layers are of a contour to conform to the bottom surface of the foot and include an upwardly extending arch flange curving upwardly along an arch area between a heel and frontal area of said insole for a distance to laterally support the bone structure in the arch area of the foot. In the method of making the insole, a blank of thermoformable material is placed on an inclined resilient support portion with the frontal portion on a firm surface and, by placing the foot on top of the layers and applying downward pressure, the heel of the foot will form a depression in the heel portion and the ball portion of the foot will flatten out the layers resting on the firm surface. In carrying out the method, a casting block is provided which is composed of a resilient material having an inclined surface portion sloping downwardly into a flat horizontal surface on which the block rests, upwardly extending sidewalls and an end wall surrounding the inclined surface portion and the flat surface so that the blank of material can be placed in the block with a heel portion resting on the inclined surface portion and a ball portion resting on the flat surface. When the foot is removed, the blank is removed and any necessary finish grinding performed, for example, to flatten the bottom surface beneath the heel portion to align it with the flat undersurface of the ball portion.

Other objects, advantages and features of the present invention will become more readily appreciated and understood when taken together with the following detailed description in conjunction with the accompanying drawings, in which:

BRIEF DESCRIPTION OF THE DRAWINGS

FIG. 1 is a sectional view of a ski boot illustrating placement of a preferred form of insole within the boot;

FIG. 2 is a plan view of the preferred form of insole shown in FIG. 1;

FIG. 3 is a cross-sectional view taken about lines 3—3 of FIG. 2;

FIG. 4 is a bottom plan view of the preferred form of insole shown in FIGS. 1 to 3;

FIG. 5 is a cross-sectional view taken about lines 5—5 of FIG. 2;

FIG. 6 is a perspective view of a preferred form of insole;

FIG. 7 is a cross-sectional view taken about lines 7—7 of FIG. 6;

FIG. 8 is a plan view of a preferred form of casting pad for use in the molding of the preferred form of insole to a desired contour;

FIG. 9 is a cross-sectional view taken about lines 9—9 of FIG. 8; and

FIG. 10 is a front view in elevation of the unit illustrated in FIG. 7.

DETAILED DESCRIPTION OF THE PREFERRED EMBODIMENT

Referring in more detail to the drawings, a preferred form of insole is illustrated in FIGS. 1 to 6 and which is specifically adaptable for use as an inner sole for boots, such as, the ski boot represented at B in FIG. 1. As a setting for the present invention, characteristically the ski boot B has an upper plastic shell C and a relatively thick inflexible sole S to which the shell C is united. In such applications, it is particularly important that the innersole 10 conform along its lower surface to the flat upper surface of the sole S and at the same time establish an optimum balance of comfort and control to the foot while permitting the foot to undergo its natural movements. To this end, the preferred form of insole 10 is comprised of multiple layers or laminations comprised of a top layer 12, intermediate layers 13, 14 and 15, and a bottom layer 16. These layers are laminated together preferably by bonding as a preliminary to the direct molding process to be described, and the bonding or laminating process can be done by any suitable type of heat-sealing operation employing heat and pressure to unite the layers together.

Considering in more detail the composition and arrangement of layers 12 to 16 making up the preferred form of insole, the layers 12, 14 and 16 are preferably composed of a cross-linked polyethylene foam which is thermo-moldable, very durable, comfortable and shock absorbent. One suitable composition is that sold under the trademark "TROCCELLIN" manufactured and sold by Dynamid Nobel of Chicago, Illinois. The top layer 12 is intended to establish a firm, high strength layer directly beneath the foot and to this end is given a thickness on the order of ⅛"(±15%) and with a density of 11 lbs. per cubic foot. Similarly, the third and fifth layers 14 and 16, respectively, are given a corresponding thickness on the order of ⅛" (±15%) but are of a slightly lesser density on the order of 9 lbs. per cubic foot. In turn, the second and fourth layers 13 and 15 may be generally characterized as filler layers designed to absorb shock and relieve surface tension and having a density on the order of 4 lbs. per cubic foot. Preferably, the layers 13 and 15 are on the order of 1/16"(±15%) in thickness and are composed of an extruded polyethylene material, such as, that sold under the trademark "VOLARA" by Voltek of Worcester, Mass. The layers 13 and 15 are also thermo-moldable and act as buffers between the top 12 and first strength layer 14 as well as between the first strength layer 14 and bottom layer 16 so as to relieve and absorb pressure build-up; and further to allow the top layer 12 and strength layers 14 and 16 to act independently of each other so as to result in stress reduction to the foot. The filler layers 13 and 15 also help strengthen the characteristics of the other layers by dispersing pressure buildup. For example, the layers 13 and 15 will maintain their thickness under areas of lesser pressure but compress or pack out under areas of weight-bearing stress, such as, along the metatarsal area and the heel area resulting in a balanced, even distribution of pressure throughout the foot.

The strength layers 14 and 16 add important support to the insole and are designed to be slightly softer than the top layer and fill in the void areas of the foot giving the insole even distribution of pressure. Again, the top layer 12 is the firmest or hardest of the layers but when combined with the other layers forms a relatively soft insole which will yield the necessary thickness-to-pressure fit. Accordingly, it is important in this respect that the upper or top layer 12 be of a greater density than the strength layers 14 and 16. In this regard, the density of the layers may vary ±10% so that, for example, the density of the top layer may range from 9.9 lbs. per cubic foot to 12.1 lbs. per cubic foot and the layers 14 and 16 may range from 8.1 lbs. per cubic foot to 9.9 lbs. per cubic foot. The fill layers 13 and 15 generally may vary in density over the same range or percentage but can be increased to as much as 6 lbs. per cubic foot. The materials of which the insole is constructed are easy to work and yield a well-defined mold but at the same time can be ground to the necessary contour and width as will be hereinafter described.

In laminating together the layers 12 to 16 to form a blank, preferably the layers 12 to 16 are subjected to flame heating at their melting point and may be a temperature on the order of 300° F. to 400° F. accompanied by the application of pressure, such as, by pressure rollers so as to cause the interfaces between layers to become heat-sealed together into a unitary structure. A relatively large blank may be formed in the manner described and consisting of the laminated layers 12 to 16, and the insole 10 is then cut to the desired outline or size, for example, as illustrated in the plan view of FIG. 2 so as to define the heel area 17, a widened arch 18 and a forefront or metatarsal area 19 and toe area 20 which tapers forwardly from the arch area 18. After laminating and uniting the layers as described, the resultant structure is then beveled around outer peripheral edges 22, as illustrated in FIG. 3, at an angle of approximately 45° and which may be done by grinding or cutting to the desired angle to conform to the line of the shoe or boot. A slightly greater angle may be formed along the arch section of the insole but by pre-beveling as preliminary to the molding process will greatly simplify the molding process as well as fitting to the shoe.

The insole or blank as described is essentially a flat but moldable structure which can be fabricated in different sizes at the factory and then shipped to the intended site of use or sale where it is then molded and fit to conform to the foot and to the boot B. Once beveled as described, the insole as viewed from the undersurface will take on that appearance as illustrated in FIG. 4.

DETAILED DESCRIPTION OF MOLDING PROCESS AND APPARATUS FOR MOLDING

Referring to FIGS. 8 to 10, a preferred form of molding apparatus or platform is illustrated at 24 and takes the form of a generally rectangular pad or block 26 having vertical sides 27, 28 and end wall 29 with a flat bottom surface 30 and top surface 32. A front inclined surface 34 extends rearwardly and upwardly from the bottom surface into the top surface, and a recessed area 36 is formed out of the body 26 to define a foot and insole-receiving cavity for molding the insole to the contour of the foot. The recess 36 is defined by inner sidewalls 38 terminating in a common rounded end 39 having a downwardly and forwardly tapered heel support section 40 extending from vertical end wall 42. The heel support section 40 terminates in a front edge 44 which is approximately equidistant between the end wall 42 and front edge 35 of the base or bottom surface 30. It should be noted also that the tapered section 40 inclines forwardly from rounded edge 41 a the junctures between the tapered section 40, sidewalls 38 and end wall 42. The angle or degree of inclination of the tapered section 40 is on the order of 5° to 10° as illustrated so as to taper at a low gradual angle away from the end wall 42.

When the casting platform is placed on a horizontal floor surface, the insole to be molded is inserted into the cavity 36 with the heel area 17 and arch area 18 resting on the tapered section 40 and the front area 19 raised slightly off the floor as illustrated in FIG. 9. The insole is centered over the tapered section as illustrated from FIG. 7 and the wearer's foot F as represented in FIG. 8 is then positioned on the insole as shown with the heel of the foot centered in the heel area 17 and the arch of the foot aligned with the arch area 18. As the weight of the foot is applied to the insole, greater pressure may be applied to the heel area 17 than to the frontal area 19, but in any event the platform will cause the insole 10 to wrap around the heel and arch areas of the foot with the ball or center of the heel compressing the insole material into a relatively flat area for the heel to rest upon. At the same time, the frontal or metatarsal area 19 of the foot will compress the insole material, causing some slight rounding or raising of the peripheral edges and to the extent that the ball portion and toes of the foot will form an impression in the upper surface; however, the lower layers are flattened by the firm or flat floor surface so as to define a plane of reference for flattening the undersurface of the insole to conform to the flat upper surface of the sole S of the boot or shoe.

In general, the combination of materials and molding will establish positive contact between the insole 10 and entire foot when the insole is inserted into a boot or shoe. The multiple layers 12 to 16 afford the necessary yield or "give" to permit natural movement of the foot while enhancing the strength of the foot by means of the momentum generated by these movements. The foot is supported in a neutral position by the formation of a deep heel cup 17 and extended arch flange 18 during the molding process, as shown in FIGS. 6 and 7. Unwanted lateral movement resulting from angulation and pronation is reduced by the elevation of the arch flange which rests high on the arch so as to support more the bone structure in the foot instead of the muscle structure under the arch. Because of the extended arch flange, the area of contact is increased and correct balancing achieved.

As noted earlier, it is important to flatten the undersurface of the insole, once molded to the foot, so that at least the heel area 17 and frontal area 19 are flush with the upper surface of the boot sole F. In addition, the arch flange 18 can be shaped by manually bending or curving upwardly into a raised portion. In fact, the flange 18 is preferably curved to a degree such that the upper edge is substantially vertical and the flange itself assumes very much the form of a saddle in which the upper surface is convex in a longitudinal direction and concave in a lateral or transverse direction. For the purpose of illustration but not limitation, the arch region 18 in the unformed blank is on the order of 25% wider than the heel portion, then gradually converges into a ball portion 19 which is on the order of 10% to 15% wider than the heel portion 17. Thus, an advantage of the multi-layered insole 10 as described in the preferred form is its ability to be reshaped or further ground to establish the proper fit once the insole is placed into the boot, for example, to avoid tightness and undue pressure on certain areas of the foot.

While the present invention has been described in its preferred form for use as an insole for ski boots, it will be evident that it is readily conformable for use in other footwear and particularly for use in other boot wear, such as, climbing or hiking boots. Moreover, depending on space and strength requirements, the number of layers may be varied according to the particular application. For example, two or more layers may be combined in the manner recited, utilizing a combination of strength and fill layers with the harder or denser strength layer above the filler layer but united together and beveled as a preliminary to the molding operation.

It is therefore to be understood that the above and other modifications and changes may be made in the construction and arrangement of elements comprising the preferred form of insole of the present invention as well as in the method and apparatus for molding same without departing from the spirit and scope of the present invention as defined by the appended claims.

I claim:

1. A custom insole for footwear comprising: a plurality of layers of thermoformable materials united together at their interfaces, all of said layers being coextensive with one another and conforming in size and contour to the bottom surface of a foot, said layers comprising at least one upper strength layer having a density of about 11 lbs. per cubic foot with a thickness of about $\frac{1}{8}$", and at least one lower filler layer united to said strength layer having a density of about lbs. per cubic foot to 6 lbs. per cubic foot and a thickness of about 1/16", said layers when united together being of substantially uniform thickness and including an upwardly extending arch flange curving upwardly along an arch area between a heel and frontal area of said insole for a distance to laterally support the bone structure in the arch area of the foot.

2. A custom insole according to claim 1, there being three strength layers, and filler layers interpositioned between each of said strength layers.

3. A custom insole according to claim 2, said upper strength layer defining a top layer of said insole, said top layer having a density of 11 lbs. per cubic foot ± 10%, and said intermediate and lower strength layers each having a density of about 9 lbs. per cubic foot ± 10%.

4. A custom insole according to claim 3, said filler layers each having a density of about 4 lbs. per cubic foot ± 10%.

5. A custom insole according to claim 1, said layers composed of a cross-linked polyethylene foam which is thermoformable.

6. A custom insole according to claim 1, said layers united together into a common integrated structure having outer peripheral edges beveled downwardly and inwardly toward a longitudinal axis of said insole.

7. In a custom insole for footwear in which a plurality of layers of thermoformable materials are united together at their interfaces and conform in size and contour to the bottom surface of a foot to be placed in said footwear, said layers comprising:
   a top layer having a density of 11 lbs. per cubic foot ±10% and a thickness of about ⅛";
   a strength layer spaced beneath said top layer having a density of 9 lbs. per cubic foot ±10% and a thickness of about ⅛";
   a filler layer between said top layer and strength layer having a density of 4 lbs. per cubic foot ±10% and a thickness of about 1/16"; and
   a bottom surface of said insole conforming to the contour of said footwear.

8. In a custom insole according to claim 7, including a bottom layer having a density of 9 lbs. per cubic foot ±10% and a thickness of ⅛", and a second filler layer interposed between said strength layer and said bottom layer having a density on the order of 4 lbs. per cubic foot and a thickness of about 1/16".

9. In a custom insole according to claim 7, including an arch portion between said heel portion and ball portion defining an extended upward arch flange.

10. In a custom insole according to claim 7, said layers composed of a thermoformable, cross-linked polyethylene foam material.

11. In a custom insole according to claim 10, said layers united together into a common integrated structure having outer peripheral edges beveled downwardly and inwardly toward a longitudinal axis of said insole.

* * * * *

UNITED STATES PATENT AND TRADEMARK OFFICE
CERTIFICATE OF CORRECTION

PATENT NO. : 5,003,708
DATED : April 2, 1991
INVENTOR(S) : Daley, Peter A.

It is certified that error appears in the above—identified patent and that said Letters Patent is hereby corrected as shown below:

| Column | Line | |
|---|---|---|
| 5 | 13 | cancel "a" and substitute -- at -- |
| 6 | 43 | after "about", insert -- 4 -- |

Signed and Sealed this

Twenty-first Day of July, 1992

Attest:

DOUGLAS B. COMER

Attesting Officer     Acting Commissioner of Patents and Trademarks